Sept. 26, 1950   J. DICKSON   2,523,283
PULSE RESOLVING NETWORK
Filed April 8, 1946

Inventor
JOHN DICKSON
By William D. Hall
Attorney

Patented Sept. 26, 1950

2,523,283

UNITED STATES PATENT OFFICE 2,523,283

PULSE RESOLVING NETWORK

John Dickson, Neptune, N. J.

Application April 8, 1946, Serial No. 660,384

13 Claims. (Cl. 343—8)

(Granted under the act of March 3, 1883, as
amended April 30, 1928; 370 O. G. 757)

The invention described herein may be manufactured and used by or for the Government for governmental purposes, without the payment to me of any royalty thereon.

My invention relates, generally, to pulse resolving networks, and particularly to the use of such networks in a radar system to reduce the effects of ground clutter. It is especially useful in mountainous regions where fixed, closely spaced obstacles provide strong, fixed, contiguous or overlapping echoes which may saturate the receiver or indicator and thus obscure the desired echoes from moving targets in the vicinity of said fixed echo region.

It is a principal object of my invention to provide a novel pulse resolving network.

It is a further object of my invention to provide a novel network for translating relatively weak, narrow pulses in the presence of powerful, wide pulses.

Another object of my invention is to provide, in a radar system, means to enhance the translation and observation of weak echoes, particularly from moving targets, in the presence of strong multiple echoes from large fixed targets.

In accordance with my invention, the pulse output of the receiver is transformed into two like, oppositely phased, video pulses. One of said pulses is retarded and then combined with the non-retarded pulse.

For a better understanding of the invention, together with other and further objects thereof, reference is had to the following description taken in connection with the accompanying drawings, wherein.

Figure 1:
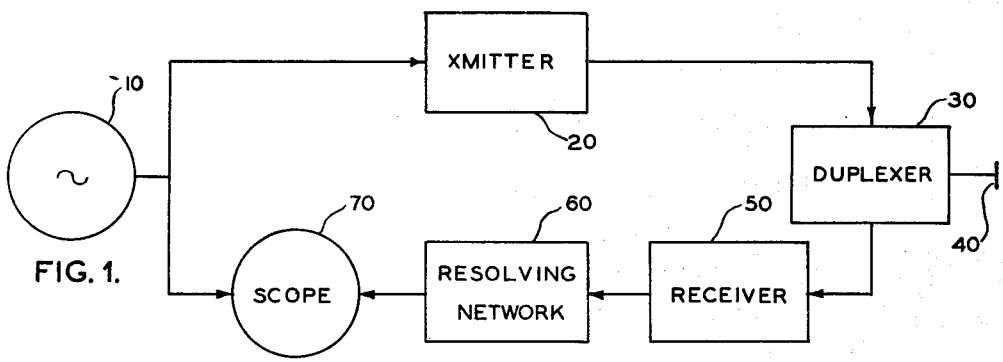
Figure 1 is a block diagram of a radar system incorporating my invention.

Referring to the drawing, Fig. 1 shows a typical radar system including a transmitter 20 and a receiver 50, both alternately coupled to a directional antenna 40 through a duplexing circuit 30. The output of the receiver is applied to the vertical deflection plates of the cathode ray tube of an oscilloscope 70. In accordance with my invention said output is first passed through the pulse resolving circuit 60, to be described hereinafter.

Transmitter 20 is normally inoperative. Under the control of an audio frequency synchronizing oscillator 10, transmitter 20 generates spaced radio pulses or wave trains at each cycle of oscillator 10. These pulses are of relatively short duration, spaced at intervals of considerably longer duration, said longer duration, as is well known, depending upon the maximum range of targets to be detected. The pulses are transmitted through an antenna 40, and the received target echoes are applied to receiver 50.

Under the control of oscillator 10, a saw tooth sweep voltage is generated in synchronism with each pulse transmitted from antenna 40, and applied to the horizontal deflecting plates of the oscilloscope 70 to provide a time base. In operation, the cathode ray beam is vertically deflected by the transmitted pulses and received echoes. The horizontal space between these vertical deflections or "pips" is a measure of the target distance.

In operating such a system in mountainous regions, or in the presence of a plurality of closely spaced, fixed targets, there are received a plurality of strong contiguous or overlapping echoes, generally designated by the term "ground-clutter," which may saturate the receiver or obscure the oscilloscope screen to such an extent that the detection of the relatively weak echoes is made difficult, if not impossible. It is a function of circuit 60 to reduce the effects of such fixed echoes to an extent which makes it possible to more easily detect the moving targets.

Figure 2:
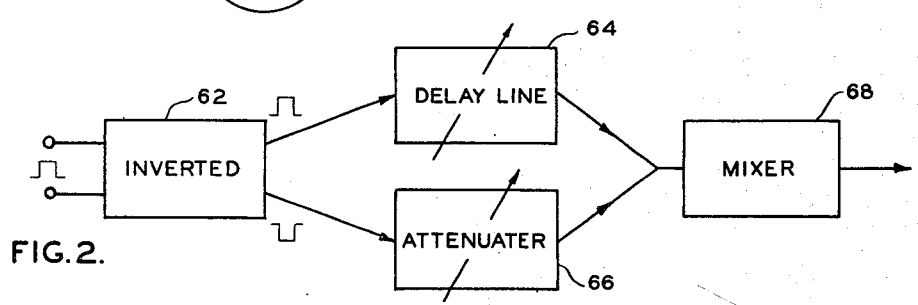
Figure 2 is a block diagram of my invention.

Figure 2 shows a block diagram of circuit 60. The pulse output of receiver 50 is applied to an inverter 62 which delivers two, oppositely-phased pulses. One pulse is applied to a delay or retardation, line 64. The other pulse is applied to an attenuator 66, which is preferably adjustable, and which attenuates the applied pulse to an extent which is preferably equal to the attenuation in the delay line 64, whereby both delayed and undelayed pulses are of equal amplitude. The two pulses are now combined in a mixer tube 68, the output of which may be further amplified by a video amplifier and then applied to oscilloscope 70.

Figure 3:
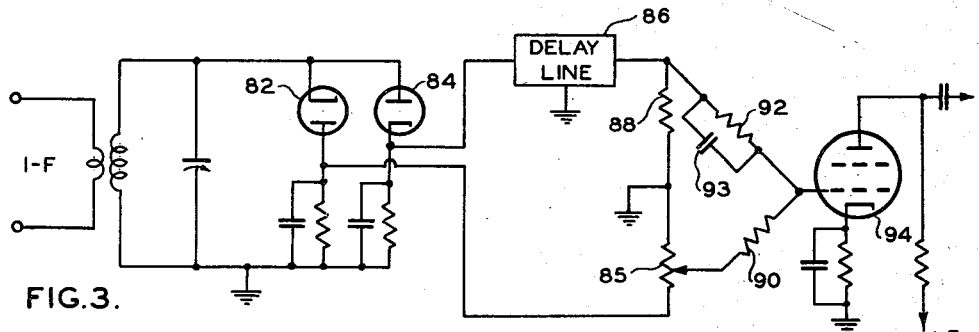
Figure 3 is a schematic circuit of one form of my invention.

Figure 3 shows another form of the invention shown in Fig. 2. The intermediate-frequency (I. F.) output of the receiver is applied in parallel to two diode detectors 82 and 84 which, because they are oppositely connected, yield two oppositely-phased pulses. The output of detector 82 is applied to an adjustable potentiometer 85, while the output of detector 84 is applied through a pulse delay line 86 to a fixed resistor 88. The oppositely-phased outputs of resistors 85 and 88 are then applied through high-resistance decoupling resistors 90 and 92, to the grid of a mixer tube 94, which yields an output, the amplitude of which is proportional to the algebraic sum of the amplitudes of both pulses. The potentiometer 85 functions as an adjustable attenuator so that the amplitude of both pulses can be equalized. Capacitor 93 compensates for the frequency characteristics of the delay line.

The operation of the above system will now be explained with reference to Fig. 4. The transmitted pulses may be of relatively narrow duration equal to the duration of the portion X of wave A. In mountainous regions the contiguous echoes combine to form a resultant echo pulse which is considerably wider than the initially transmitted pulse, as indicated by Z. The receiver may be saturated by signals above the amplitude indicated by the dotted line S or such signals may take up the entire display surface of the oscilloscope screen. Therefore, a weak target echo, such as represented by X, in the vicinity of said fixed echoes, will not be observed at all.

Assuming that wave A is the output of the receiver, this wave is delayed by delay line 64, whereby it lags behind the initial wave represented at B, on which component Y represents the desired target echo corresponding to component X on wave A. Preferably, delay line 64 should be adjusted so that the wave A is retarded behind wave B by an amount which is equal to, or a major fraction of, the duration of the transmitted pulses, which is, of course, equal to the duration of the component X on wave A. The output of mixer 68, which is the algebraic sum of waves A and B, is represented by wave C. It will be seen that the components X' and Y' on wave C, which represents the echo which it is desired to observe, and which is the combination of components X and Y of waves A and B, are now in the zero amplitude region, whereby they are well below the saturation level of the succeeding amplifiers and will appear on the base line of the oscilloscope, where they can be easily observed.

If the target which it is desired to observe is moving, the observation of the echo thereof will be greatly enhanced. Because of the Doppler effect, the phase of the reflected wave trains from the moving target will progressively vary with respect to the phase of the echo wave trains from the adjacent fixed targets. The resultant beat will cause the amplitude of echo components X' and Y' to continuously vary at a sinusoidal rate, thereby making it even more distinguishable from the fixed amplitude echoes of the fixed targets. For this reason, my invention is particularly advantageous when used with a coherent pulse system, such as is disclosed in the copending application of Charles G. McMullen, S. N. 648,807, filed February 19, 1946.

Figure 4:
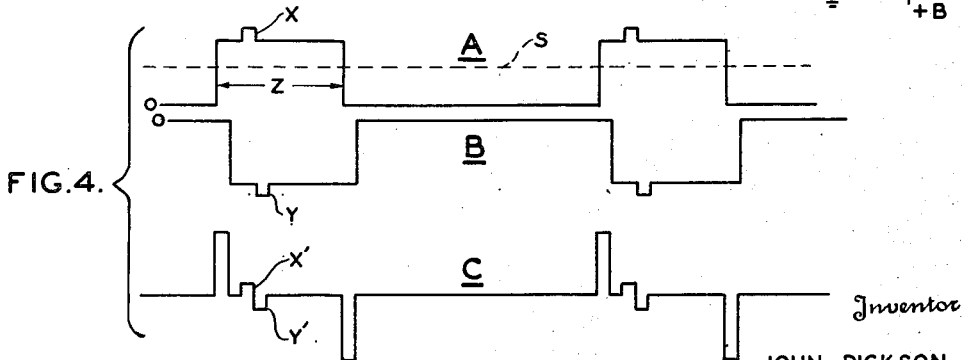
Figure 4 is a family of wave diagrams illustrating the operation of my invention.

It will be understood that the wave shapes shown in Fig. 4 are idealized in order to facilitate the explanation of operation of the circuit. In actual practice, the wave shapes will be more nearly trapezoidal and more irregular, depending upon the nature of the terrain in which the equipment operates.

The improved pulse resolving circuit shown in Fig. 2 or Fig. 3 is not necessarily restricted for the use described above. It may, under certain circumstances, be used as a differentiating network, and with other wave shapes. This will be evident from the following analysis, taken in connection with Fig. 5.

Figure 5:
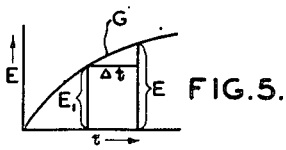
Figure 5 is a mathematical curve illustrating another aspect of my invention.

Let the curve G in Fig. 5 represent some voltage (E) as a function of time (t). In the mixer 68, let the voltage E be the voltage from the attenuator 66 and the voltage $E_1$ (actually with polarity opposite to E) be the voltage from the delay line 64. $E_1$ has the same magnitude that E had at a time $\Delta t$ (delay time) previous, but opposite polarity. Now, when E and $E_1$ add in the mixer (remembering that their polarities are opposite) the output of the mixer will be equal to $\Delta E$. Thus the output of the mixer will be $\Delta E$ with respect to time, where $\Delta E$ is the voltage increment for a time $\Delta t$ equal to the delay in line 64.

Let $E=f(t)$ and $E_1=f(t-\Delta t)$. Then $\Delta E=E-E_1$ or $f(t)-f(t-\Delta t)$ which, when expanded by Taylor's series, gives:

$$\Delta E = f(t) - \left[ f(t) + (-\Delta t) f'(t) + \frac{(-\Delta t)^2}{2!} f''(t) + \ldots \frac{(-\Delta t)^n}{n!} f^n(t) + \ldots \right]$$

provided that $f(t)$ is a well behaved function, i. e., the second and following derivatives satisfy the following equation:

$$\frac{f(i)(t)}{i!} \ll (\Delta t)^{1-i}; \quad i=2, 3, \ldots$$

Expanding the above series:

$$\Delta E = \Delta t f'(t) - \frac{(\Delta t)^2}{2!} f''(t) - \ldots - \frac{(-\Delta t)^n}{n!} f^n(t) - \ldots$$

or $$\Delta E = \Delta t \left[ f'(t) - \frac{\Delta t}{2!} f''(t) - \ldots - \frac{(-\Delta t)^{(n-1)}}{n!} f^n(t) - \ldots \right]$$

From this it can be seen that $\Delta E$ is proportional to the first derivative plus and minus small fractions of the higher derivatives. The smaller $\Delta t$ becomes the less important is the value of these higher derivatives. Thus true differentiation is approached for small values of $\Delta t$. Of course the amplitude of the first derivative drops as $\Delta t$ is decreased but the higher derivatives decrease faster.

A solution for a sine wave may be derived as follows:
Let $$f(t) = E_0 \sin t$$
$$\Delta E = E_0 \sin \omega t - E_0 \sin \omega(t - \Delta t)$$
$$= E_0 \left[ 2 \sin \frac{\omega \Delta t}{2} \cos \omega \left( t - \frac{\Delta t}{2} \right) \right]$$

From this last equation it appears that $\Delta E$ is a cosine wave with an amplitude of $$2E_0 \sin \frac{\omega \Delta t}{2}$$

and phase displacement $$-\frac{\Delta t \omega}{2}.$$

The smaller $\Delta t$ becomes, the less is the phase displacement but at the same time the amplitude decreases. Since the cosine is the derivative of the sine, differentiation is approached. The amplitude has zero values for a sine wave when $\omega \Delta t$ is equal to $n\pi$ and maxima when $\omega \Delta t$ is equal to $(2n-1)\pi/2$. These points correspond to phase shifts of $n\pi$ and $(2n-1)\pi/2$ respectively.

From the foregoing description, it will be seen that my invention can be used for differentiating a wave in a manner which is superior to the resistance-capacitance circuit usually used for this purpose, since, in the latter, the resulting wave decays exponentially, thereby departing from true differentiating action.

It will also be seen that my invention is particularly useful for resolving or separating pulse signal components; particularly in a pulse-echo object detection system for separating from a plurality of continuous overlapping echoes, the component due to a desired target.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. The method of translating a composite wave having a first component of given duration and a second component of shorter duration superimposed upon said first component, which comprises generating from said wave a second wave of opposite phase, equally retarding both components of one of said waves relative to the other wave by an amount approximately equal to the duration of said second component, and combining said retarded and non-retarded waves to derive a resultant wave.

2. The method of translating a pulse having a first component of given duration and a second component of shorter duration superimposed upon said first component, which comprises generating from said pulse a second pulse of opposite phase, equally retarding both components of one of said pulses relative to the other pulse by an amount approximately equal to the duration of said second component, substantially equalizing the amplitudes of said retarded and non-retarded pulses, and combining them to derive a resultant pulse.

3. In a pulse-echo object detection system wherein recurrent wave trains are transmitted from a given point and a plurality of strong, fixed, contiguous or overlapping echoes pulses are received at said point and combine to form a resultant pulse of considerably longer duration than the transmitted wave trains, the method of translating said resultant pulse so as to detect a relatively weak echo from a moving target in the vicinity of said fixed echoes, which comprises the steps of deriving from said resultant pulse a like pulse of opposite phase, equally retarding all components of one of said pulses by an amount which is approximately equal to the duration of said transmitted pulse, and combining said retarded and non-retarded pulses to derive a resultant signal to be observed.

4. In a radio pulse-echo object detection system wherein recurrent wave trains are transmitted from a given point a plurality of strong, fixed, contiguous or overlapping echoes are received at said point and combine to form a resultant pulse of considerably longer duration than the transmitted wave trains, the method of translating said resultant pulse so as to detect a relatively weak echo from a moving target in the vicinity of said fixed echoes, which comprises the steps of deriving from said resultant pulse a like pulse of opposite phase, equally retarding all components of one of said pulses by an amount which is considerably less than the duration of said resultant pulse, equalizing the amplitudes of the retarded and non-retarded pulses and combining said equalized pulses to derive a signal to be observed.

5. In a radio pulse-echo object detection system, means for transmitting pulses of given duration from a given point, means for receiving echoes of said pulses at said point, means for retarding said echoes by an amount approximately equal to said given duration, and means for combining retarded and non-retarded echoes in phase opposition.

6. In a radio pulse-echo object detection system, means for transmitting pulses of given duration from a given point, means for receiving echoes of said pulses at said point, means for retarding said echoes by an amount approximately equal to said given duration, means equalizing the amplitudes of said retarded and non-retarded echoes, and means for combining said equalized echoes in phase opposition.

7. The method of visually indicating recurrent pulses upon the screen of a cathode ray tube, each of said pulses having a first component of given duration and amplitude and a second component of smaller amplitude and duration superimposed in the vicinity of the crest of said first component, comprising the steps of periodically deflecting the beam of said cathode ray tube along one coordinate in synchronism with said pulses, deriving from each of said pulses a pair of coincident pulses of equal amplitude, displacing the timing of both components of said pair of pulses relative to each other by an amount equal to the duration of said second component, combining the displaced pulses in opposition, and deflecting the beam of said cathode ray tube along a second coordinate with said combined pulses.

8. The method of visually indicating recurrent pulses upon the screen of a cathode ray tube, each of said pulses having a first component of given duration and fixed amplitude and a second component of varying amplitude and shorter duration superimposed upon said first component, comprising the steps of periodically deflecting the beam of said cathode ray tube along one coordinate in synchronism with said pulses, deriving from each of said pulses a pair of coincident pulses of equal amplitude, displacing the timing of both components of said pair of pulses relative to each other by an amount equal to the duration of said second component, combining the displaced pulses in opposition, and deflecting the beam of said cathode ray tube along a second coordinate with said combined pulses.

9. The method of visually indicating recurrent pulses upon the screen of a cathode ray tube, each of said pulses having a first component of given duration and amplitude and a second component of smaller amplitude and duration superimposed upon said first component, comprising the steps of periodically deflecting the beam of said cathode ray tube in synchronism with said pulses, deriving from each of said pulses a pair of coincident pulses of equal amplitude and opposite phase, further displacing the timing of both components of said pair of pulses relative to each other by an amount equal to the duration of said second component, combining the displaced pulses, and deflecting the beam of said cathode ray tube along a second coordinate with said combined pulses.

10. In a pulse-echo object detection system wherein pulses are transmitted from a given point and wherein echoes of said pulses are received at said point and displayed upon a cathode ray tube in which the beam is deflected along one coordinate in synchronism with the pulse transmission, the method of clarifying the display of echoes from a target moving in the vicinity of a plurality of fixed targets, the echoes of which combine with the moving target echoes to form a composite pulse having a fixed component of given duration and amplitude and a varying amplitude component of shorter duration and amplitude, comprising the steps of deriving from each composite pulse a pair of coincident pulses of equal amplitude, displacing the timing of both components of said pair of pulses relative to each other by an amount equal to the duration of said second component, combining the displaced pulses in opposition, and deflecting the beam of said cathode ray tube along a second coordinate with said combined pulses.

11. A pulse-echo object detection system comprising means for transmitting from a point spaced pulses of wave energy, echo-detecting means at said point comprising a receiver wherein echoes from a moving object provide a signal which periodically varies in amplitude, means comprising an oscilloscope coupled to said receiver and synchronized with the transmitted pulses for displaying said echoes, and a network between said receiver and oscilloscope for resolution of said signal, said network comprising means for deriving from each received echo a pair of signals of like amplitude, means for delaying all components of said pair of signals relative to each other by an amount equal to the duration of each transmitted pulse, and means energized in opposition by said pair of signals for controlling the beam of said oscilloscope.

12. A pulse-echo object detection system comprising means for transmitting from a point spaced pulses of radio-frequency energy, echo-detecting means at said point comprising a receiver wherein echoes from an object moving in the vicinity of a fixed object combine with echoes from said fixed object to provide a signal which periodically varies in amplitude, means comprising an oscilloscope coupled to said receiver and synchronized with the transmitted pulses for displaying said echoes, and a network between said receiver and oscilloscope for resolution of said signal, said network comprising means for deriving from each echo a pair of signals of like amplitude, means for delaying all components of said pair of signals relative to each other by an amount equal to the duration of each transmitted pulse, and means energized in opposition by said pair of signals for deflecting the beam of said oscilloscope.

13. A pulse-echo object detection system comprising means for transmitting from a point spaced pulses of radio-frequency energy, echo-detecting means at said point comprising a receiver wherein echoes from an object moving in the vicinity of a fixed object combine with echoes from said fixed object to provide a signal which periodically varies in amplitude, means comprising an oscilloscope coupled to said receiver and synchronized with the transmitted pulses for displaying said echoes, and means in said receiver for resolution of said signal, said last-named means comprising means for deriving from each echo a pair of oppositely-phased signals, a delay network for delaying one of said pair of signals by an amount equal to the duration of each transmitted pulse, an attenuation network equalizing the amplitude of the other of said pair of signals with the output of said delay network, a mixing circuit, decoupling resistors for connecting said networks to said mixing circuit, and means energized by the output of said mixing circuit for deflecting the beam of said oscilloscope.

JOHN DICKSON.

REFERENCES CITED

The following references are of record in the file of this patent:

UNITED STATES PATENTS

| Number | Name | Date |
|---|---|---|
| 2,226,459 | Bingley | Dec. 24, 1940 |
| 2,310,692 | Hansell | Feb. 9, 1943 |
| 2,391,411 | Goble | Dec. 25, 1945 |
| 2,404,527 | Potapenko | July 23, 1946 |
| 2,422,135 | Sanders | June 10, 1947 |
| 2,430,038 | Wertz | Nov. 4, 1947 |
| 2,433,838 | Elie | Jan. 6, 1948 |
| 2,437,173 | Rutherford | Mar. 2, 1948 |
| 2,444,438 | Grieg | July 6, 1948 |